(12) United States Patent
Sønderkær

(10) Patent No.: US 8,499,508 B2
(45) Date of Patent: Aug. 6, 2013

(54) PANEL ELEMENT COMPRISING A FRAME WITH A PANEL UNIT

(75) Inventor: Peter Sønderkær, Fredericia (DK)

(73) Assignee: VKR Holding A/S, Soeborg (DK)

( * ) Notice: Subject to any disclaimer, the term of this patent is extended or adjusted under 35 U.S.C. 154(b) by 2354 days.

(21) Appl. No.: 10/513,672

(22) PCT Filed: May 7, 2003

(86) PCT No.: PCT/DK03/00302
§ 371 (c)(1),
(2), (4) Date: Feb. 7, 2005

(87) PCT Pub. No.: WO03/095785
PCT Pub. Date: Nov. 20, 2003

(65) Prior Publication Data
US 2005/0183384 A1    Aug. 25, 2005

(30) Foreign Application Priority Data
May 7, 2002 (DK) ................................. 2002 00693

(51) Int. Cl.
*E06B 3/66* (2006.01)
*E06B 3/663* (2006.01)

(52) U.S. Cl.
USPC ............... 52/204.593; 52/204.6; 52/204.597

(58) Field of Classification Search
USPC ........... 52/204.6, 210–213, 204.5, 202–203, 52/746, 741, 208, 204.53, 204.54, 204.591, 52/204.593, 204.597, 204.595
See application file for complete search history.

(56) References Cited

U.S. PATENT DOCUMENTS

| | | | | |
|---|---|---|---|---|
| 3,030,673 A | | 4/1962 | London | |
| 3,553,913 A | * | 1/1971 | Eisenberg | 52/172 |
| 3,667,179 A | * | 6/1972 | Eisenberg | 52/209 |
| 4,456,335 A | * | 6/1984 | Mumford | 349/16 |
| 4,494,342 A | * | 1/1985 | Decker | 52/203 |
| 4,542,611 A | * | 9/1985 | Day | 52/172 |
| 4,689,933 A | * | 9/1987 | Biro | 52/656.5 |
| 5,270,084 A | | 12/1993 | Parker | |
| 5,834,124 A | * | 11/1998 | Pease et al. | 428/430 |
| 5,950,398 A | * | 9/1999 | Hubbard | 52/786.1 |
| 5,983,593 A | * | 11/1999 | Carbary et al. | 52/786.11 |
| 6,209,269 B1 | * | 4/2001 | Valderrama | 52/171.3 |
| 6,529,266 B1 | * | 3/2003 | Sandstrom | 355/72 |
| 6,612,091 B1 | | 9/2003 | Glover et al. | |

(Continued)

FOREIGN PATENT DOCUMENTS

| | | |
|---|---|---|
| DE | 3049356 | 10/1982 |
| DE | 3228364 | 2/1984 |

(Continued)

OTHER PUBLICATIONS

DE 299 14 607 U1, Qick-Fit Seat for Drain Lid At Road Surface, Inventor: Chang, Priority Date: Aug. 31, 1998.*

*Primary Examiner* — Jeanette E. Chapman
(74) *Attorney, Agent, or Firm* — Merek, Blackmon & Voorhees, LLC

(57) ABSTRACT

The panel element (1) comprises a frame made up of a number of frame members (2-5) as well as a panel unit (6) including at least one vacuum multi-layer pane and at least one single-layer sheet element. A spacing element is placed between the vacuum multi-layer pane and the single-layer sheet element. The spacing element is made integrally with the corresponding frame member or as a separate spacing profile.

5 Claims, 2 Drawing Sheets

U.S. PATENT DOCUMENTS

Figure 1:
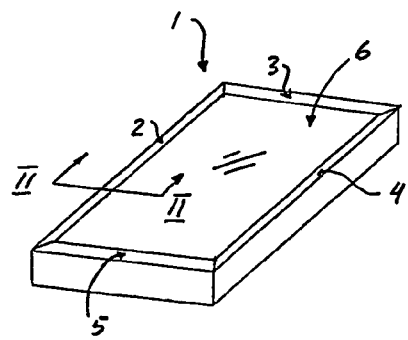

| | | |
|---|---|---|
| 6,763,638 B1 * | 7/2004 | Berger, Jr. .................... 52/204.6 |
| 6,830,791 B1 * | 12/2004 | Misonou et al. ................ 428/34 |
| 2003/0041533 A1 | 3/2003 | Trpkovski |

FOREIGN PATENT DOCUMENTS

| | | |
|---|---|---|
| DE | 3633620 | 4/1988 |
| DE | 296 21 302 | 3/1997 |
| EP | 0 765 988 | 4/1997 |
| EP | 1030023 | 8/2000 |
| FR | 715284 | 11/1931 |
| FR | 2508968 | 1/1983 |
| WO | WO 98/25001 | 6/1998 |
| WO | 0032620 | 6/2000 |
| WO | WO 0036260 | 6/2000 |

* cited by examiner

PANEL ELEMENT COMPRISING A FRAME WITH A PANEL UNIT

The present invention relates to a panel element comprising a frame made up of a number of frame members, a panel unit including at least one vacuum multi-layer pane and at least one single-layer sheet element, the panel unit being connected to said frame members along a circumferential edge portion.

Panel elements with a single-layer sheet element such as a single-layer pane, a thin natural stone surface, a thin ceramic sheet or another suitable thin sheet material as outer layer and a vacuum multi-layer pane as inner layer are used increasingly because of the good insulating qualities offered by vacuum panes.

In particular, the good insulating qualities do, however, cause that the difference in temperature between the inside of the vacuum pane and its outside becomes so large that there is a risk of subjecting the vacuum pane to too large stresses, particularly in case of large differences between indoor and outdoor temperatures. These stresses can, in the worst case, cause the vacuum pane to be broken and that the whole panel unit in the panel element therefore needs exchanging.

Because of their construction such multi-layer panel units are relatively complicated and expensive to produce.

On this background, it is an object of the invention to provide a panel element of the kind mentioned in the introduction, which is simple and cheap to produce, and where the risk of damaging in particular the vacuum pane is reduced compared to previously known constructions.

These and other purposes are achieved according to the invention by placing at least one spacing element between said at least one vacuum multi-layer pane and said at least one single-layer sheet element, which at least one spacing element is connected to each frame member.

In this manner, in a simple way, a space is provided between the single-layer sheet element and the vacuum pane, where the space along the periphery is delimited by the spacing element itself in the individual frame members and acts as a temperature equalizing chamber preventing or at least reducing the differences in temperature present in the prior art. In this way, the panel element according to the invention becomes particularly advantageous price wise, during production as well as during use.

In a simple embodiment with regard to production, the spacing element is constructed integrally with the corresponding frame member.

In an alternative embodiment enabling the use of one and the same frame member for vacuum panes and outside faces with different thicknesses, the spacing element is designed as a separate spacing profile attached to the corresponding frame member by means of gluing, mechanical fixing or the like.

In a further development of the above-mentioned alternative embodiment, the spacing element is designed with an adjustable height, which entails that a standardized spacing element can also be used in connection with a standardized frame construction for different thicknesses of vacuum panes and outside faces.

With a view to providing humidity absorption in the spacing between the single-layer sheet element and the vacuum pane, the spacing element can contain or carry a drying agent.

Furthermore, between the vacuum multi-layer pane and the single-layer sheet element, a screening device can be placed. The screening device can have a decorative and/or practical function, but can also be added in order to optimize the thermic qualities of the panel element.

Figure 2:
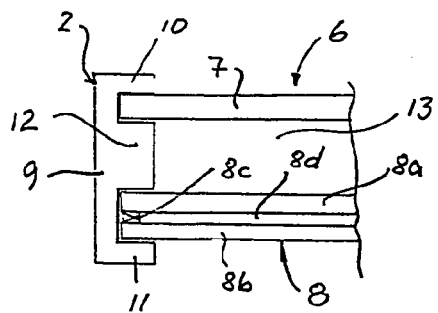

The invention is described in further detail in the following, with reference to the schematic drawing, where FIG. 1 shows a perspective view of a panel element according to the invention, FIG. 2 shows a sectional view on a larger scale along the line II-II in FIG. 1, FIG. 3 a view corresponding to FIG. 2 of the panel element of a second embodiment of the invention, FIG. 4 a view corresponding to FIG. 2 of the panel element in a third embodiment of the invention, FIG. 5 a view corresponding to FIG. 2 of the panel element in a fourth embodiment of the invention, and FIG. 6 a view corresponding to FIG. 2 of the panel element of a fifth embodiment of the invention.

In FIG. 1, a panel element generally designated 1 is shown, which element is a window sash in the embodiment shown, but which might just as well be a panel element for use in a fillet, a door panel element, an insulating non-transparent decorative panel element or the like. The panel element 1 comprises a frame constructed by a number of frame members 2-5, where the frame in the embodiment shown is mainly rectangular, but could have any conceivable geometrical shape. In the frame members 2-5, an edge portion of a panel unit 6 has been encased where in FIG. 1, only a single-layer sheet element 7 is visible, where said element forms the outside or the outdoor face of the panel unit 6, i.e. the side which faces the open in a mounted position, and which element is for example made from toughened glass.

FIG. 2 illustrates the construction of a first embodiment of the panel element 1, where the connection between the panel unit 6 and the frame member 2 is shown. From this figure, it appears that in addition to the single-layer sheet element 7, the panel unit 6 comprises a vacuum multi-layer pane 8, which, in the mounted position of the panel element 1, is adapted to face towards the inside face. The vacuum multi-layer pane is designed in a manner known per se and includes a first and a second pane layer 8a,8b, connected along their edge portions, i.e. at a circumferential soldering 8c. The spacing 8d between the pane layers 8a, 8b is decompressed, and with a view to keeping the pane layers 8a,8b at a mutual distance, a number of not shown spacing parts are placed in the spacing 8d.

The frame member 2 is formed with a base portion 9, from which protruding flanges 10,11 extend, where said flanges cover edge portions the of single-layer sheet element 7 and the second pane layer 8b in the vacuum multi-layer pane 8 respectively. The frame member 2 furthermore includes a portion 12 extending between the single-layer sheet element 7 and the first pane layer 8a, which portion serves as spacing element and which, along with corresponding spacing elements at the other frame members 3-5, delimits a spacing 13 between the single-layer sheet element 7 and the vacuum multi-layer pane 8. The portion 12 can contain or carry a drying agent to keep the spacing 13 free of humidity. This spacing 13 is not decompressed, but nor is it ventilated, as not shown sealing elements, possibly in combination with a sealing material, are placed between the single-layer sheet element 7, the vacuum pane 8 and the individual frame members in the frame. The sealing material can be placed as a one-step or two-step sealing constituted by materials with low permeability to water and atmospheric gasses. The spacing 12 can be filled with air, i.e. dried atmospheric air, or an inert gas, such as Argon, Krypton or a mixture. With a view to improving the insulating ability of the panel element, alternatively to increase the safety against exposing the vacuum multi-layer pane to too large fluctuations in temperature, which might damage it, one or more of the pane layers can be provided with a film in the form of a thin foil or a coating which for instance reduces the formation of dew and/or is self-cleaning or sun screening on this side.

The frame can be formed from profiles of a suitable material such as wood or a plastic material, or a metal material such as rust proof steel.

Figure 3:
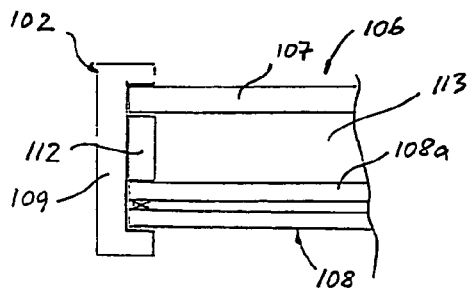

In FIG. 3, a second embodiment of the profile element according to the invention is shown, where parts with similar or analogue functions as corresponding parts in the embodiment shown in FIG. 2 are designated with the same reference numerals with the addition of 100. Only details differing from the embodiment in FIG. 2 will be described in further detail.

In this embodiment, the spacing element is designed as a separate part 112, which is fastened to the base portion 109 of the frame member 102, i.e. by means of gluing or mechanical fixing, for instance by means of screws or snap lock members, and which is designed as a spacing profile with a suitable cross section. The design of the spacing element 112 can vary and can for instance include an extruded profile member with flange portions extending parallel to and being connected to the single-layer sheet element 107 and the first pane layer 108a in the vacuum multilayer pane 108 by means of i.e. a butyl adhesive, after which a joint sealant, such as silicone, is added on the outside facing side, i.e. the side facing the edge of the panel unit 106. The spacing element 112 can contain or be a carrier of a drying agent to keep the spacing 113 free of humidity.

Figure 4:
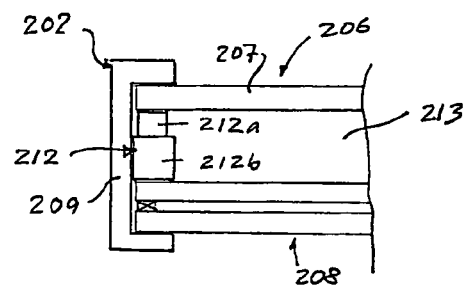

In FIG. 4, a third embodiment of the profile element according to the invention is shown, where parts with similar or analogue functions as corresponding parts in the embodiment shown in FIG. 3 are designated with the same reference numerals with the addition of 100. Only details differing from the embodiment in FIG. 3 will be described in further detail.

Similarly to the embodiment in FIG. 3, the spacing element is constituted by a separate part 212, which does, however, have an adjustable height, for example such that the part 212 as suggested in FIG. 4, is made as two telescopically connected parts 212a and 212b, of which the part 212b is attached to the base portion 209 of the frame member 202, for example as described in connection with the embodiment in FIG. 3. One of the parts 212a or 212b of the spacing element can contain or be a carrier of a drying agent to keep the spacing 213 free of humidity. After determination of the desired distance between the single-layer sheet element 207 and the vacuum multilayer pane 208, the height is adjusted, i.e. the dimension parallel to the base portion 209 of the frame member 202, after which the two parts 212a and 212b are fixed relative to one another.

Figure 5:
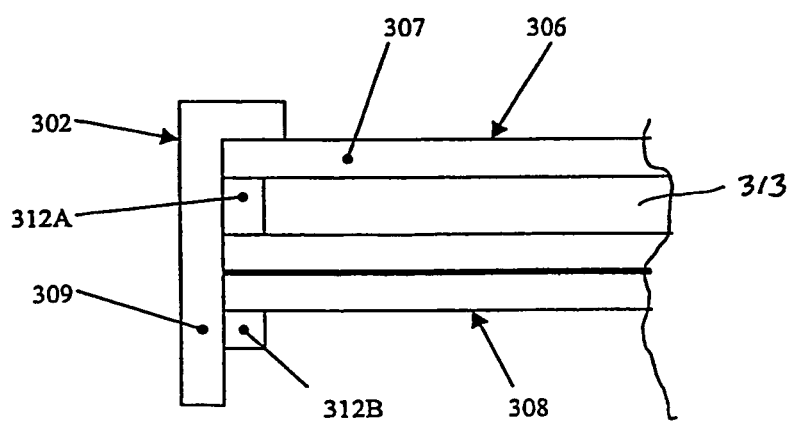

In FIG. 5, a fourth embodiment of the profile element according to the invention is shown, where parts with similar or analogue functions as corresponding parts in the embodiment shown in FIG. 4 are designated with the same reference numerals with the addition of 100. The spacing element 312A is designed as a separate element fastened to the frame element 309, for instance by gluing or by mechanical fixing. The spacing element 312A can contain or be a carrier of a drying agent in order to keep the spacing 313 free of humidity. The height of the element 312A can be adapted to the optimum thickness for pane spacings filled with air or inert gas. Furthermore, the variation includes a sealing element or fixing element 312B where sealing on the surface abutting on the vacuum pane 308, may be undertaken i.e. by means of silicone or the like. The element 312B can be fixed to the frame element 309, i.e. by means of gluing or by mechanical fixing for instance with screws or snap lock members.

Figure 6:
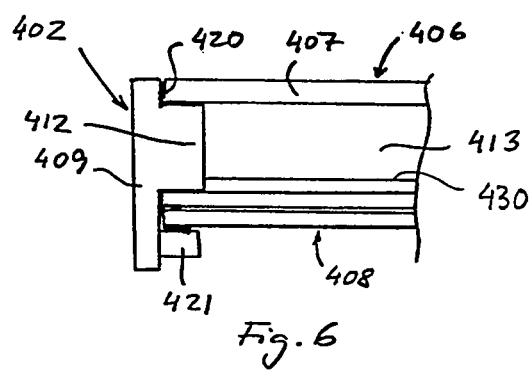

In FIG. 6, a fifth embodiment is shown, where parts with similar or analogue functions as corresponding parts in the embodiment shown in FIG. 2 are designated with the same reference numerals with the addition of 400. Only details differing from the embodiment in FIG. 2 will be described in further detail.

In this embodiment, the base portion 408 of the frame member 402 does not have any protruding flanges corresponding to the flanges 10, 11. On the other hand, at the upper part of the base portion, a groove 420 is created, in which the single-layer sheet element 407 is fastened for instance by gluing, alternatively in combination with a sealing having an appropriately low permeability to water and atmospheric gasses. The vacuum pane 408 is fastened to the frame member 402 by means of a separate glazing bead 421 fixed to the frame member 409, i.e. by gluing or by mechanical fixing i.e. by screws or snap lock members. In that connection, it is appropriate that the spacing element 412, in case of a frame member of wood, is surface treated with an airtight coating or the like, such as a ceramic surface in order for the spacing 413 to become in the main airtight.

Finally, in FIG. 6, a screening device 430 is shown. The screening device can be of the kind changing characteristics as a consequence i.e. of lighting and/or changes in temperature. Apart from serving more or less decorative and/or practical purposes such as i.e. sun screening, illumination or decoration, it can also contribute to optimising the thermic and physical qualities, i.e. by reducing stress as a consequence for instance of fluctuations in temperature. As shown, the screening device 430 can be fastened to the frame or be applied to the vacuum pane or the single-layer sheet element.

The invention is not to be considered as being limited to the embodiments shown and described. The design of the vacuum panes and the outer layers may thus be varied, just as the design of the individual frame members may be modified in a suitable way.

The invention claimed is:

1. A panel element comprising:
   a frame made up of a number of frame members (2-5;102; 202;302;402),
   a panel unit (6;106;206;306;406) including at least one pre-made vacuum multi-layer pane (8;108;208;308;408) exposed to indoors and at least one single-layer sheet element (7;107;207;307;407) exposed to outdoors, the panel unit being connected to said frame members along a circumferential edge portion,
   characterized in that at least one spacing element (12;112; 212;312A;412) is placed between said at least one vacuum multi-layer pane (8;108;208;308;408) and said at least one single-layer sheet element (7;107;207;307; 407), said at least one spacing element delimits a space between said at least one vacuum multi-layer pane and said at least one single-layer sheet element along a periphery of said at least one vacuum multi-layer pane and said at least one single-layer sheet element, said at least one spacing element is connected to each frame member (2;102;202;302;402), and said at least one spacing element (12;412) is constructed integrally with the corresponding frame member (2;402).

2. A panel element according to claim 1, characterized in that said at least one spacing element (112;212;312A) is designed as a separate spacing profile attached to the corresponding frame member (102;202;302) by gluing or mechanical fixing.

3. A panel element according to claim 1, characterized in that said at least one spacing element (12;112;212;312A;412) contains or carries a drying agent.

4. A panel element according to claim 1, characterized in that between said at least one vacuum multi-layer pane (8;108;208;308;408) and said at least one single-layer sheet element (7;107;207;307;407) a screening device (430) is placed.

5. A panel element comprising:
   a frame made up of a number of frame members (2-5;102; 202;302;402),
   a panel unit (6;106;206;306;406) including at least one pre-made vacuum multi-layer pane (8;108;208;308;408) exposed to indoors and at least one single-layer sheet element (7;107;207;307;407) exposed to outdoors, the panel unit being connected to said frame members along a circumferential edge portion,
   characterized in that at least one spacing element (12;112; 212;312A;412) is placed between said at least one vacuum multi-layer pane (8;108;208;308;408) and said at least one single-layer sheet element (7;107;207;307; 407), which at least one spacing element is connected to each frame member (2;102;202;302;402),
   in that said at least one spacing element (112;212;312A) is designed as a separate spacing profile attached to the corresponding frame member (102;202;302) by gluing or mechanical fixing, and
   in that said at least one spacing element (212) is made with an adjustable height.

* * * * *